Patented Jan. 29, 1952

2,583,772

UNITED STATES PATENT OFFICE 2,583,772

ACID AND QUATERNARY SALTS OF POLYAMIDES

Lewis O. Gunderson, Park Ridge, Ill., assignor to Dearborn Chemical Company, Chicago, Ill., a corporation of Illinois No Drawing. Application February 12, 1949, Serial No. 76,191

14 Claims. (Cl. 260—401)

This invention relates to new and novel compositions of matter, and particularly to acid and quaternary salts of polyamides.

The present application is a continuation-in-part of application No. 25,983, filed May 8, 1948, entitled "Method and Composition for Water Conditioning."

An object of the present invention is to provide high molecular weight water-dispersable compounds, useful as foam inhibiting compounds, flotation agents in mineral and material separation, and demulsification compounds.

A further object of the present invention is to provide novel derivatives of polyamides which are useful as wetting agents, resin intermediates, pharmaceutical intermediates, and the like.

The compounds of the present invention have the following general formula:

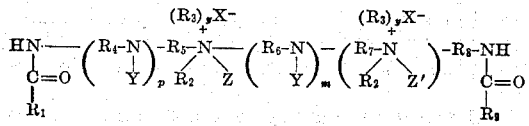

where $R_4$, $R_5$, $R_6$, $R_7$ and $R_8$ are alkylene groups, $R_1$ and $R_9$ are hydrocarbon groups containing at least 11 carbon atoms, $R_2$ is selected from the group consisting of alkyl, alkoxy, substituted alkyl, and substituted alkoxy groups, $R_3$ is an alkyl group, X is an anion of a mineral acid, Y is selected from the group consisting of hydrogen and acyl radicals, Z and Z' are selected from the group consisting of hydrogen and alkyl radicals, $m$, $n$ and $p$ are 0, 1 or 2, and $y$ is 0 or 1.

These compounds comprise the reaction product formed between a solubilizing agent such as dimethyl sulfate, dimethyl sulfite, methyl chloride, methyl iodide, B, B' dichloro diethyl ether, benzyl chloride, ethyl p-toluene sulfonate, and the like, and a polyalkylene polyamine that has been subjected to acylation with a higher carboxylic acid to an extent such that at least two acyl groups have been attached to the polyalkylene polyamine.

The term solubilizing agent includes those compounds having the ability to replace one or more of the hydrogens of an amino group with alkyl groups.

The organic compounds to which the present invention particularly relates comprise high molecular weight acylation products of polyalkylene polyamines, such as diethylene triamine, triethylene tetramine, tetraethylene pentamine, and other polyethylene polyamines, dipropylene triamine, tripropylene tetramine, di-isopropylene triamine, tri-isopropylene tetramine, dibutylene triamine, and the like. Other polyalkylene polyamine compounds may also be used; for instance, polyalkylene polyamine compounds characterized by heterogeneous linkages within the molecule, such as an ether, thio, thionyl, or aromatic radical as well as the polyamides resulting from the reaction of a polyethylene polyamine, e. g., diethylene triamine, with a dibasic acid, e. g., succinic acid, in molar proportions of two to one. These polyalkylene polyamine compounds are condensed with non-aromatic carboxylic acids containing at least 12 and preferably at least 16 carbon atoms. Such non-aromatic carboxylic acids may be substituted or unsubstituted, straight or branched chain, or cyclic, and saturated or unsaturated. Thus, carboxylic acids other than those present in or derived from vegetable and animal fats and oils may be used, for instance, naphthenic acids. The resulting polyalkylene polyamide compounds may comprise in part high molecular weight fatty acids and in part other high molecular weight carboxylic acids and/or cyclic acids. Examples of such acylating acids are oleic acid, stearic acid, palmitic acid, erucic acid, linoleic acid, linolenic acid, ricinoleic acid, palmitated ricinoleic acid, monohydroxy stearic acid, dihydroxy stearic acid, cetyloxy butyric acid, behenic acid, keto-hydroxy stearic acid, lauric acid, high molecular weight naphthenic acids, and the various aldehyde acids which may be prepared from ricinoleic acid.

In connection with the use of fatty acids as acylating agents, it should be noted that commercial fatty acids always contain more than one species of acid. When using such commercial reagents, it is quite likely that the acylating groups will vary in chain length and hydrogen content. Thus, $R_1$ and $R_9$ depicted in the general formula could easily be different groups.

The high molecular weight polyamides may be prepared by condensing a polyalkylene polyamine with a non-aromatic carboxylic acid or a derivative thereof, such as an ester, anhydride, or halide in such proportions and under such conditions as to effect at least monoacylation of both of the primary amino groups present in the polyalkylene polyamine. The fatty glycerides are examples of esters that are good acylating agents, and include substances such as tallow, coconut oil, lard oil, cotton-seed oil, peanut oil, soy bean oil, castor oil, whale oil, sardine oil, and the like. In general, condensation may be carried out by simply heating a polyalkylene polyamine with a non-aromatic carboxylic acid, a fatty acid, a fatty glyceride, or an acyl halide, in appropriate molecular proportions as, for example, with one or more moles of fatty acid for each mole of polyalkylene polyamide. I have found that reacting a fatty acid, e. g., stearic acid, with a polyamine, e. g., diethylene triamine, in equi-molecular ratio at a temperature of about 175° C. (±20° C.) will result in the production of the diamide as the predominant reaction product, with only a small amount of the monoamide being produced. The heating may be carried out for from two to six hours or more at a temperature of about 140° C. and up. For the preparation of triacylated or tetracylated compounds from polyalkylene polyamines containing two or more secondary amino groups, a temperature of 175° C. or higher is preferred.

From the polyalkylene polyamides of higher fatty acids prepared as described hereinabove, the acid and quaternary salts of the polyamides may be prepared by reacting the polyalkylene polyamides with an amine-alkylating agent such as dimethyl sulfate or dimethyl sulfite. In general, at least one molecular proportion of dimethyl sulfate or dimethyl sulfite is used in conjunction with one molecular proportion of polyalkylene polyamide. When a one-to-one molecular ratio is employed, the resulting products are salts of the monomethylated derivatives of the polyalkylene polyamides. When dimethyl sulfate is employed, the salts of the methyl sulfuric acid are obtained. When dimethyl sulfite is employed, the salts of the corresponding sulfinic acids are obtained.

By way of example: By starting with triethylene tetramine that has been diacylated in the primary amino groups with a compound such as stearic acid, thus leaving two secondary amino groups in the molecule, upon the addition of the first mole of dimethyl sulfate, the methyl sulfuric acid salt will form on one of the secondary amino groups. The addition of the second mole of dimethyl sulfate will form the methyl sulfuric acid salt of the remaining secondary amino group. Upon addition of a third mole of dimethyl sulfate, the hydrogen of the sulfuric acid salt group will be replaced by a methyl group, forming the quaternary compound. On the other hand, if the triethylene tetramine had been triacylated, the quaternary salt would be formed upon the addition of two moles of dimethyl sulfate.

In general, the dimethyl sulfate or dimethyl sulfite may simply be added to the polyalkylene polyamine and such heat supplied as may be required for completing the reaction. If desired, a solvent, such as pyridine, may be used, or an alkali may be added to the reaction mixture.

The polyalkylene polyamide may also be acylated within the molecule by means of short chain acylating compounds, for example, acetyl chloride or acetic anhydride.

The following examples are illustrative of the types of compounds falling within the scope of the invention:

A. Compounds having a single quaternary ammonium group:

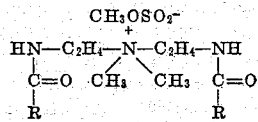

Dimethyl ammonium methyl sulfinate quaternary of dinaphthenoyl diethylene triamine, R being a naphthenic acid residue.

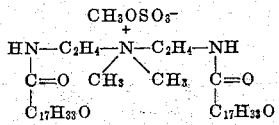

Dimethyl ammonium methyl sulfate quaternary salt of the diricinoleamide of diethylene triamine.

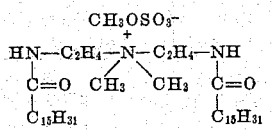

Dimethyl ammonium methyl sulfate quaternary salt of dipalmitoyl diethylene triamine.

B. Compounds having two quaternary ammonium groups as well as a secondary amide group in the molecule:

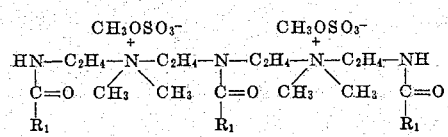

Di-methyl ammonium methyl sulfate quaternary salt of trinaphthenoyl tetraethylene pentamine. $R_1$ representing a naphthenic acid residue.

C. Compounds having one quaternary ammonium group as well as a plurality of secondary amide groups:

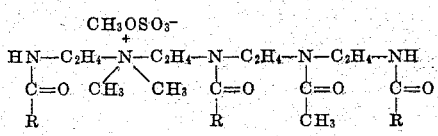

Dimethyl ammonium methyl sulfate quaternary salt of trinaphthenoyl acetyl tetraethylene pentamine. R represents a naphthenic acid residue.

D. Compounds having a quaternary ammonium group as well as a tertiary amine salt:

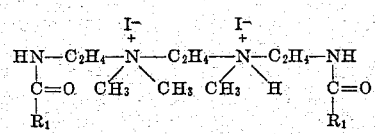

Dimethyl ammonium iodide quaternary methylamine iodide salt of dinaphthenoyl triethylene tetramine. $R_1$ represents a naphthenic acid residue.

E. Compounds having a quaternary ammonium group, a tertiary amine salt, and a secondary amide group:

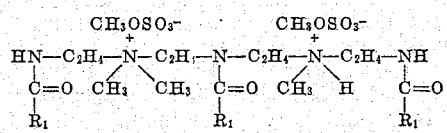

Dimethyl ammonium methyl sulfate quaternary methylamine methylsulfuric acid salt of trinaphthenoyl tetraethylene pentamine, where $R_1$ represents a residue from a naphthenic acid.

F. Compounds having a single tertiary amine salt

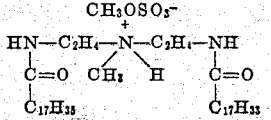

Methyl sulfuric acid salt of N-methyl, N', N'' stearoyloleoyl diethylene triamine.

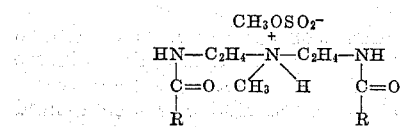

Methyl sulfinic acid salt of N-methyl, N', N'' dinaphthenoyl diethylene triamine. R represents a naphthenic acid residue.

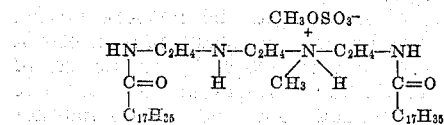

Methyl sulfuric acid salt of N-methyl, N', N'', distearoyl triethylene tetramine.

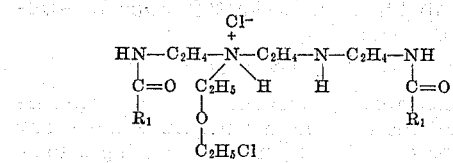

Condensation product obtained by reacting triethylene tetramine with soybean oil in equimolecular amounts and then treating the resulting polyamide with one mole of dichloroethyl ether. $R_1$ represents any of the fatty acid groups containing at least 11 carbon atoms present in the soybean oil.

G. Compounds having more than one tertiary amine salt group:

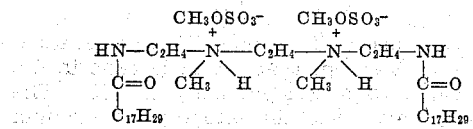

Di-(methyl sulfuric acid salt) of N-methyl, N' methyl, N'', N''' dilinolenoyl triethylene tetramine.

H. Compounds having a tertiary amine salt group and a secondary amide radical:

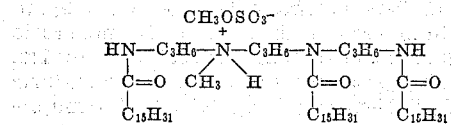

Methyl sulfuric acid salt of N-methyl, N', N'', N''' tripalmitoyl tripropylene tetramine.

I. Compounds having two tertiary amine salt groups and a secondary amide group:

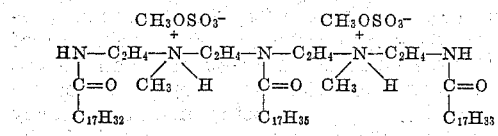

Di(methyl sulfuric acid salt of N-methyl), N', N'', N''' stearoyl dioleoyl tetraethylene pentamine.

The preparation of the compounds of the present invention is illustrated by the examples given hereinbelow:

Example I 8.8 gr. soybean oil, 2 gr. tetraethylene pentamine and 0.6 gr. water were heated in a flask, first for one-half hour on a steam bath, and thereafter for 2 hours at 150° C. After cooling, 1.3 gr. dimethyl sulfate were added. The temperature thereupon initially rose to 90° C. When the reacting mixture began to cool, heat was applied, the final temperature one hour after the addition of the dimethyl sulfate being 148° C. 11.9 gr. of a clear viscous oil were obtained. A tertiary amine salt of the type shown in group F was produced.

Example II 8.8 gr. soybean oil, 1.5 gr. triethylene tetramine (1:1 mole ratio), and 0.6 gr. water were heated, first for one-half hour in a steam bath and thereafter for 2 hours at 156° C., yielding 10.1 gr. of a wax having a saponification number of 3.9, 8.9 gr. of this wax were mixed with ½ gr. dimethyl sulfate. When the reaction mixture began to cool, heat was applied to raise the temperature to 153° C. After one-half hour there was obtained a clear viscous oil dispersible in water. The product was a mixture of the types of compounds shown in groups F and H.

Example III 58.5 gr. soybean oil, 10.8 gr. triethylene tetramine (96%) and 5.3 gr. acetic anhydride were heated together for 8 hours at from 132° to 159° C., yielding a dark brown clear viscous oil characterized by an acid number of 15.8. On standing, the oil formed a paste having a melting point of 130° C. 7.4 gr. of the paste and 1.3 gr. dimethyl sulfate were stirred together in a test tube to form a clear homogeneous oil. The temperature rose from 22° to 45° C. One gram of the resulting oil was found to be dispersible in 10 cc. of water. A waxy precipitate was obtained on addition of 10% sodium carbonate solution, indicating that the amine salt had been formed, of the type represented by group F.

Example IV

Oleic acid and triethylene tetramine in molecular proportions of 2:1 were heated together for 6 hours at from 140° to 161° C. and thereafter for three hours at from 143° to 158° C., yielding a product characterized by an acid number of 3.28. 13.2 gr. of the resulting amide were heated to just above its melting point and 5 cc. (6.75 gr.) of dimethyl sulfate was then added dropwise. The temperature rose to 140° C., and this temperature was maintained for ½ hour to complete the reaction. The final product could be dispersed in water as a 2% dispersion. The product was probably a double amine salt of the type represented by group G.

Example V

Triethylene tetramine and oleic acid were reacted together as described in Example IV. 13.2 gr. of the resulting product was heated to just above the melting point, and 10.1 cc. (13.6 gr.) of dimethyl sulfate was introduced dropwise. The temperature rose to 140° C., and this temperature was maintained for ½ hour to complete the reaction. The final product could be dispersed in water as a 2% solution. The reaction product was probably a mixture of the types of compounds disclosed in groups B and D.

Example VI 29.2 gr. triethylene tetramine and 113.6 gr. of stearic acid were heated at about 180° C. for 6 hours. The reaction made was then allowed to cool to 125° C. and 43 gr. of dimethyl sulfite were added gradually. The initial reaction was exothermic, the temperature rising spontaneously to 135° C. (during the addition of 30 gr. of dimethyl sulfite). When no more heat was generated, the mixture was refluxed at 110° C. for 6 hours. After cooling, the reaction mixture was poured into benzene, the resulting hot solution filtered, and the filtrate was cooled to 10° C. to crystallize the product. Recrystallization from benzene was repeated. The crystalline product amounted to 110 gr. and formed a stable emulsion with water when warmed to about 30° C. to 40° C. The resulting dispersion was not apparently affected by the addition of sodium hydroxide solution. The predominant product was probably of the type represented by group G, with small amounts of compounds represented by group D.

*Example VII*

Triethylene tetramine was heated with lauric acid (prepared from coconut fatty acids by removal of fatty acids containing less than 12 carbon atoms) in molecular proportion of 3:1. The temperature was kept at 150° to 160° C. for more than 12 hours. 20.1 gr. of the resulting product was heated with 2.7 gr. of dimethyl sulfate for ½ hour at 153° to 155° C. The final product was a dark brown waxy solid dispersible in water. The product was of the type represented by those in group H.

*Example VIII*

Triethylene tetramine (14.6 gr. or 0.1 mole) was heated with 6.0 gr. (⅓ mole) of water and 96.6 gr. (0.3 mole) of naphthenic acid (a mixture of carboxylic acids recovered from crude petroleum having an average acid number of 174) for ½ hour at 85° to 90° C. and then for 2 hours at 155° C.

To 68.4 gr. of the resulting polyamine was added 8.3 gr. of dimethyl sulfate (equimolar ratio). This addition caused a rise in temperature from 33 to 68° C. External heat was then applied until a temperature of 153° C. was reached. This temperature was maintained for ½ hour.

The crude final product is essentially a methyl sulfuric acid salt of a methylated polynaphthenic amide of triethylene tetramine of the type shown in group H. It is a highly viscous black colored oil.

*Example IX*

Triethylene tetramine (14.6 gr. or 0.1 mole) was heated with 96.6 gr. (0.3 mole) of naphthenic acid for 6 hours at 180° C. The product is a highly viscous black oil.

This naphthenic polyamide was then treated with 29.4 gr. (0.2 mole) of methyl iodide. Heat was liberated spontaneously at the start. Then external heat was applied and a temperature of 150° C. held for 2 hours.

The final product is a quaternary derivative of the original naphthenic amide. This type of compound is represented by group C. It is a black colored waxy solid.

*Example X*

8.8 gr. of soybean oil was added to a solution of 1.5 gr. triethylene tetramine and 0.6 gr. water. This mixture was heated for ½ hour at 90° C. and for two hours at 140° C.

To the resulting polyamide was then added 1.9 gr. of triglycol dichloride and the mixture heated for four hours at 140° C. The resulting product is a brown paste-like mass. The product is a tertiary amine salt of the type shown in group F.

*Example XI*

8.8 gr. of soybean oil was added to a solution of 2.0 gr. of tetraethylene pentamine and 0.6 gr. water. This mixture was heated at 150° C. for 5½ hours, resulting in a clear light brown colored oil.

1.7 gr. of dichloroisopropyl ether was added to the polyamide thus produced, and the mixture was heated at 140° C. for 2 hours. A clear brown oil resulted. The reaction product is a compound of the type represented by group F.

*Example XII*

8.8 gr. of soybean oil was added to 1.5 gr. of triethylene tetramine and the mixture heated at 150° C. for 6 hours. The resulting light brown colored wax was then treated with 1.3 gr. of dimethyl sulfate for 2 hours at 150° C. The methylated polyamide obtained in this manner was then converted to the corresponding quaternary ammonium salt by heating for 2 hours at 150° C. with 1.9 gr. of the methyl ester of p-toluene sulfonic acid.

*Example XIII*

One molecular proportion of tetraethylene pentamine was condensed with three molecular proportions of a naphthenic acid having a neutralization equivalent of 300 at 190° C. ± 10° C. for a period of 8 hours. The water insoluble polyamide was reacted with dimethyl sulfate in mole ratio of about 1:5 until the alkylation was substantially complete. The water dispersible product was a di-methyl ammonium methyl sulfate quaternary salt of trinaphthenoyl tetraethylene pentamine, the type of compound shown in group B.

*Example XIV*

The reactions of Example XIII were repeated in all respects except that the mole ratio in the final condensation was changed to 1:3. The reaction product was the dimethyl ammonium methyl sulfate quaternary-methyl amine methyl sulfuric acid salt of trinaphthenoyl tetraethylene pentamine, a type of compound shown in group E.

*Example XV*

The reactions of Example XIII were again repeated in all respects except that the mole ratio in the final condensation was changed to 1:2. The resulting product was the di(methyl sulfuric acid salt of N-methyl) N', N'', N''' trinaphthenoyl tetraethylene pentamine, a type of compound shown in group G.

*Example XVI*

One molecular proportion of diethylene triamine was condensed with two molecular proportions of palmitic acid at a temperature of 180° C. for six hours. The resulting diamide was reacted with two molecular proportions of dimethyl sulfate, the latter being introduced slowly into the diamide reaction product until all the alkylating agent had been added. Thereafter, the temperature was raised to 140° C. and maintained at that temperature for ½ hour. The reaction product was dispersible in water and was not precipitated when the solution was made alkaline, indicating the formation of a quaternary ammonium salt. This type of compound is shown in group A.

I claim as my invention:

1. A compound having the formula:

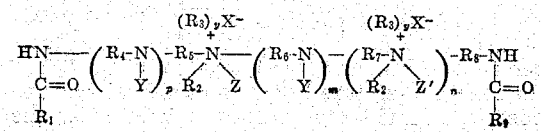

where $R_4$, $R_5$, $R_6$, $R_7$ and $R_8$ are short chain alkylene groups containing 2 to 3 carbon atoms, $R_1$ and $R_9$ are aliphatic hydrocarbon groups containing at least 11 carbon atoms, $R_2$ is a hydrophilic group containing an alkyl chain of one to two carbon atoms, $R_3$ is short chain alkyl group, X is an ion selected from the group consisting of sulfate, sulfonate and halide ions, Y is selected from the group consisting of hydrogen and carboxylic acyl radicals, Z and Z' are selected from the group consisting of hydrogen and short chain alkyl radicals, but where Z and Z' are alkyl, Y is acyl, $m$, $n$ and $p$ are 0, 1 or 2, and $y$ is 0 or 1.

2. A compound having the formula:

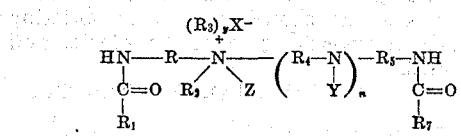

where $R_1$ and $R_7$ are aliphatic hydrocarbon groups containing at least 11 carbon atoms, R, $R_4$ and $R_5$ are alkylene groups containing from 2 to 3 carbon atoms, $R_2$ is a hydrophilic group containing an alkyl chain of 1 to 2 carbon atoms, $R_3$ is a short chain alkyl group, X is an ion selected from the group consisting of sulfate, sulfonate and halide ions, Z is a member of the group consisting of hydrogen and short chain alkyl groups, Y is a member of the group consisting of hydrogen and carboxylic acyl radicals, but where Z is alkyl, Y is acyl, $n$ is 0, 1 or 2, and $y$ is 0 or 1.

3. A compound having the formula:

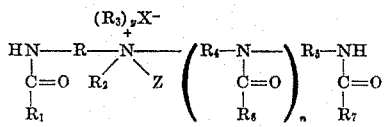

wherein $R_1$, $R_6$ and $R_7$ are aliphatic hydrocarbon groups containing at least 11 carbon atoms, R, $R_4$ and $R_5$ are alkylene groups containing from 2 to 3 carbon atoms, $R_2$ is a hydrophilic group containing an alkyl chain of 1 to 2 carbon atoms, $R_3$ is a short chain alkyl group, X is an ion selected from the group consisting of sulfate, sulfonate and halide ions, Z is a member of the group consisting of hydrogen and short chain alkyl radicals, $n$ is 0, 1 or 2, and $y$ is 0 or 1.

4. A compound having the formula:

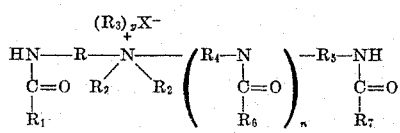

where $R_1$, $R_6$ and $R_7$ are aliphatic hydrocarbon groups containing at least 11 carbon atoms, R, $R_4$ and $R_5$ are alkylene groups containing from 2 to 3 carbon atoms, $R_2$ and $R_3$ are short chain alkyl groups, X is an ion selected from the group consisting of sulfate, sulfonate and halide ions, $n$ is 0, 1 or 2, and $y$ is 0 or 1.

5. A compound having the formula:

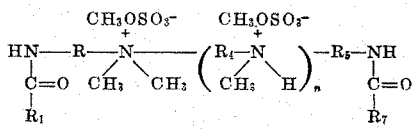

wherein $R_1$ and $R_7$ are hydrocarbon groups containing at least 11 carbon atoms, R, $R_4$ and $R_5$ are alkylene groups containing 2 to 3 carbon atoms and $n$ is 0 or 1.

6. A compound having the formula:

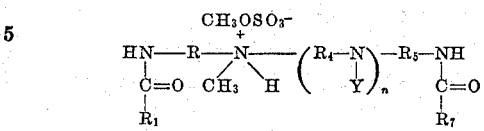

wherein $R_1$ and $R_7$ are hydrocarbon groups containing at least 11 carbon atoms, R, $R_4$ and $R_5$ are alkylene groups containing from 2 to 3 carbon atoms, Y is a member of the group consisting of hydrogen and carboxylic acyl radicals, and $n$ is 0, 1 or 2.

7. A compound having the formula:

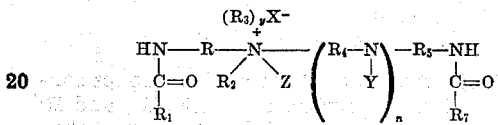

where $R_1$ and $R_7$ are hydrocarbon groups containing at least 15 carbon atoms, R, $R_4$ and $R_5$ are alkylene groups containing from 2 to 3 carbon atoms, $R_2$ is a hydrophilic group containing an alkyl chain of 1 to 2 carbon atoms, $R_3$ is a short chain alkyl group, X is an ion selected from the group consisting of sulfate, sulfonate and halide ions, Z is a member of the group consisting of hydrogen and short chain alkyl radicals, Y is a member of the group consisting of hydrogen and carboxylic acyl radicals, but where Z is alkyl, Y is acyl, $n$ is 0, 1 or 2, and $y$ is 0 or 1.

8. A compound having the formula:

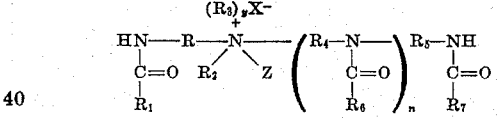

wherein $R_1$, $R_6$ and $R_7$ are hydrocarbon groups containing at least 15 carbon atoms, R, $R_4$ and $R_5$ are alkylene groups containing 2 to 3 carbon atoms, $R_2$ is a hydrophilic group containing an alkyl chain of 1 to 2 carbon atoms, $R_3$ is a short chain alkyl group, X is an ion selected from the group consisting of sulfate, sulfonate and halide ions, Z is a member of the group consisting of hydrogen and short chain alkyl radicals, $n$ is 0, 1 or 2, and $y$ is 0 or 1.

9. A compound having the formula:

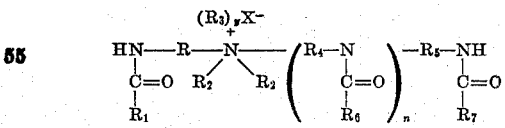

where $R_1$, $R_6$ and $R_7$ are hydrocarbon groups containing at least 15 carbon atoms, R, $R_4$ and $R_5$ are alkylene groups containing from 2 to 3 carbon atoms, $R_2$ and $R_3$ are short chain alkyl groups, X is an ion selected from the group consisting of sulfate, sulfonate and halide ions, $n$ is 0, 1 or 2, and $y$ is 0 or 1.

10. A compound having the formula:

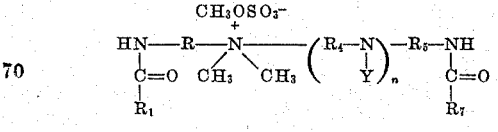

wherein $R_1$ and $R_7$ are hydrocarbon groups containing at least 15 carbon atoms, R, $R_4$ and $R_5$ are alkylene groups containing from 2 to 3 carbon atoms, Y is a carboxylic acyl radical, and $n$ is 0, 1 or 2.

11. A compound having the formula:

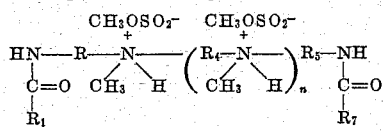

where $R_1$ and $R_7$ are hydrocarbon groups containing at least 15 carbon atoms, R, $R_4$ and $R_5$ are alkylene groups containing 2 to 3 carbon atoms, and $n$ is 0 or 1.

12. A compound having the formula:

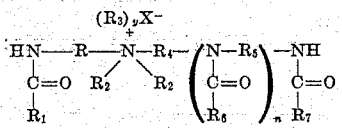

where $R_1$, $R_6$ and $R_7$ are hydrocarbon groups containing at least 15 carbon atoms, R, $R_4$, and $R_5$ are alkylene groups containing 2 to 3 carbon atoms, $R_2$ and $R_3$ are short chain alkyl groups, X is an ion selected from the group consisting of sulfate, sulfonate and halide ions. $n$ is 0, 1 or 2, and $y$ is 0 or 1.

13. A compound having the formula:

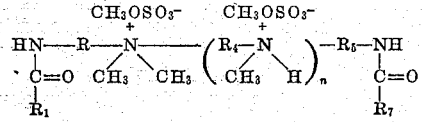

wherein $R_1$ and $R_7$ are hydrocarbon groups containing at least 15 carbon atoms, R, $R_4$ and $R_5$ are alkylene groups containing 2 to 3 carbon atoms, and $n$ is 0 or 1.

14. A compound having the formula:

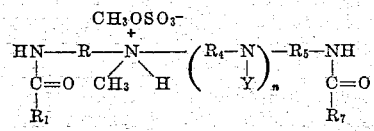

wherein $R_1$ and $R_7$ are hydrocarbon groups containing at least 15 carbon atoms, R, $R_4$ and $R_5$ are alkylene groups containing 2 to 3 carbon atoms, Y is a member of the group consisting of hydrogen and carboxylic acyl radicals, and $n$ is 0, 1 or 2.

LEWIS O. GUNDERSON.

REFERENCES CITED

The following references are of record in the file of this patent:

UNITED STATES PATENTS

| Number | Name | Date |
|---|---|---|
| 1,924,698 | Neelmeier et al. | Aug. 29, 1933 |
| 2,008,649 | Ulrich | July 16, 1935 |
| 2,259,650 | Maxwell | Oct. 12, 1941 |
| 2,357,598 | Mauersberger | Sept. 5, 1944 |
| 2,425,392 | Robinson et al. | Aug. 12, 1947 |
| 2,468,086 | Latham et al. | Apr. 26, 1949 |